United States Patent [19]

Monzel et al.

[11] Patent Number: 5,071,262
[45] Date of Patent: Dec. 10, 1991

[54] SQUEEZE FILM DAMPER FLUID CONTROL

[75] Inventors: Fred J. Monzel, Loveland; Michael J. Stallone, Cincinnati, both of Ohio

[73] Assignee: General Electric Company, Cincinnati, Ohio

[21] Appl. No.: 610,199

[22] Filed: Nov. 5, 1990

[51] Int. Cl.⁵ .............................................. F16C 27/00
[52] U.S. Cl. ...................................... 384/99; 384/581
[58] Field of Search ........................... 384/99, 535, 581

[56] References Cited

U.S. PATENT DOCUMENTS

| | | | |
|---|---|---|---|
| 3,844,630 | 10/1974 | Lechner | 384/99 |
| 4,046,430 | 9/1977 | Buono et al. | 384/99 |
| 4,213,661 | 7/1980 | Marmol | 384/99 |
| 4,337,983 | 7/1982 | Hibner | 384/99 |
| 4,392,751 | 7/1983 | Michiaka et al. | 384/99 |
| 4,527,912 | 7/1985 | Klusman | 384/99 |
| 4,838,028 | 6/1989 | Witt | 384/99 X |
| 4,867,655 | 9/1989 | Barbic | 384/99 X |

FOREIGN PATENT DOCUMENTS 107114  8/1980  Japan ..................................... 384/99

OTHER PUBLICATIONS

Vance et al "Experimental Measurement of the Dynamic Force Response of a Squeeze-Film Bearing Damper", *Journal of Engineering for Industry* 11/1975 pp. 1282-1290.

*Primary Examiner*—Thomas R. Hannon
*Attorney, Agent, or Firm*—Jerome C. Squillaro; Charles L. Moore, Jr.

[57] ABSTRACT

A squeeze film damper having spaced opposite piston rings for damper fluid sealing includes a fluid plenum groove adjacent and inboard of each ring to serve as a lower pressure receiver for damper fluid and as a reservoir to receive and supply fluid during pumping action of the damper.

9 Claims, 1 Drawing Sheet

SQUEEZE FILM DAMPER FLUID CONTROL

BACKGROUND OF THE INVENTION

This invention relates to vibration damping in hot gas turbine engines and other such rotary machines, and more particularly to improved hydraulic or viscous damping means associated with the bearing supports for rotating masses in such machines.

The occurrence of cyclical orbital motion of the shaft of a hot gas turbine engine rotor as a result of dynamic instability and rotor unbalance is well known, and fluid damping means such as squeeze film dampers are utilized to dampen orbital and other undesirable shaft motion. In general, such dampers include the use of a pressurized fluid, such as an oil, in a small damper space between a bearing support element, such as the outer circumferential surface of a rolling element bearing outer race, and an opposing annular wall of an annular bearing housing chamber in which the race is confined with permitted limited radial motion. Damper fluid is introduced into the defined annular damper space between the circumferential outer race and the annular housing, and vibratory or orbital motion of the bearing race causes the race to exert a squeezing action on the damper fluid to move or distribute the fluid throughout the defined damper space. Various sealing arrangements are employed to retain or seal the fluid in the damper space. In one such sealing arrangement, spaced apart opposite piston type rings are often employed between the bearing race and the housing as axial fluid seals for the damper space. A continuous supply of damper fluid is required for operation of such dampers, and optimum operation requires that the fluid be introduced in a timely and effective manner at a proper location in the damper. Accordingly, damper fluid supply and control, as well as effective operation of the piston ring seals, are important factors in squeeze film dampers and their operation.

OBJECTS OF THE INVENTION

It is an object of this invention to provide an improved squeeze film damper device.

It is another object of this invention to provide improved damper fluid supply and sealing means for a squeeze film damper.

It is yet another object of this invention to provide improved damper fluid supply adjacent the squeeze film region of a squeeze film damper.

It is still another object of this invention to incorporate a lower pressure fluid reservoir or supply plenum adjacent each of a pair of piston ring seals in a squeeze film damper.

SUMMARY OF THE INVENTION

A squeeze film damper associated with a bearing supported rotating shaft utilizes spaced piston type rings to seal damper fluid in the damper where the shaft may undergo orbiting motion and produce a pumping action on damper fluid in the damper. A large circumferential plenum channel or groove is provided adjacent and inboard of each piston ring to receive fluid from the higher pressure region of the damper and serve as a reservoir to automatically supply fluid to the damper when pressure conditions warrant.

DESCRIPTION OF A PREFERRED EMBODIMENT

Figure 1:
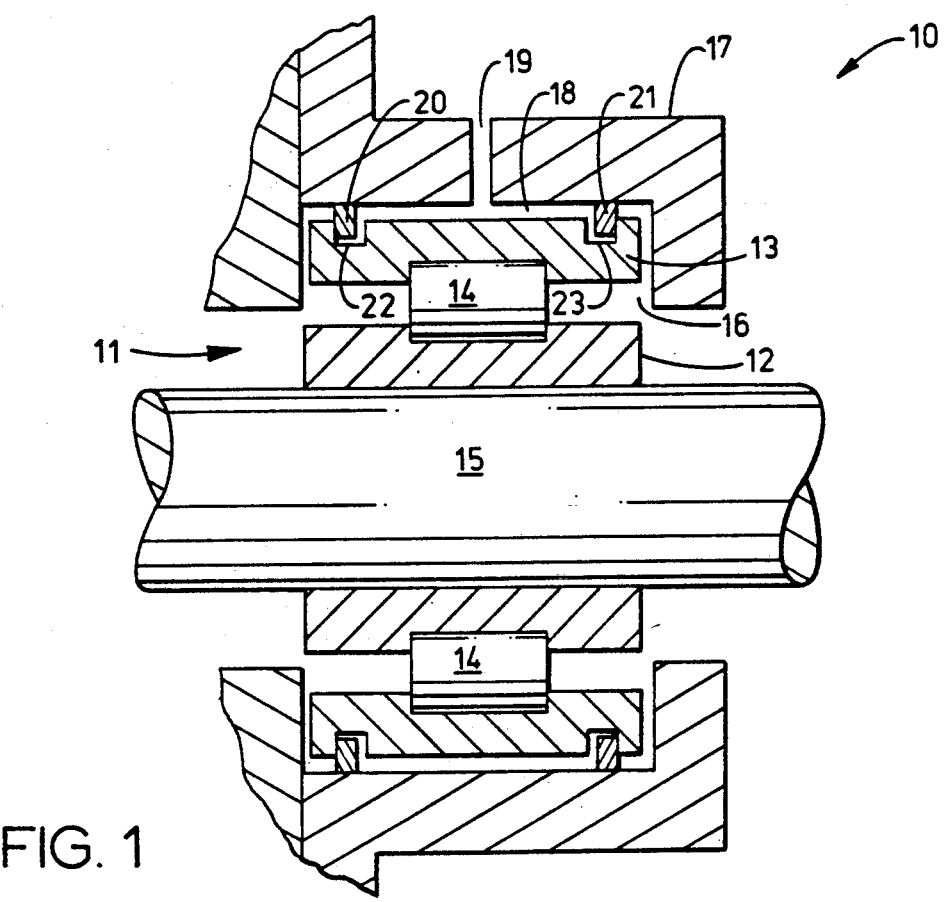
FIG. 1 is a cross-sectional a schematic illustration of a roller bearing assembly squeeze film damper structure.

Referring now to FIG. 1 a squeeze film damper assembly 10 is schematically illustrated in conjunction with a rolling element bearing 11. Bearing 11 comprises an inner annular race 12 and an outer annular race 13 between which rolling elements 14 are positioned to support a shaft 15 for rotation. As illustrated in FIG. 1 outer race 13 is slidingly received for radial motion in a closely confining annular chamber 16 within a supporting housing 17. The outer circumferential planar surface of outer annular race 13 is spaced from the inner and abutting wall of chamber 16 to define an annular squeeze film chamber or space 18. Bearing assembly 11, together with shaft 15 therein, is permitted to move in the vertical direction as viewed in FIG. 1 by bearing race 13 moving deeper into chamber 16. However, this movement is controlled or restricted by oil under pressure entering squeeze film space 18 through an oil inlet 19 where the compressing or squeezing action of race 13 on the fluid generates a resisting force to radial motion of shaft 15. The arrangement as described is referred to as a squeeze film damper and finds particular application to rotating machinery, for example, to dampen vibration in the rotor shaft of a hot gas turbine engine. Oil is retained or constrained in squeeze film space 18 by means of spaced apart opposite piston rings 20 and 21 fitted in circumferential ring grooves 22 and 23, respectively, in the outer circumference of outer race 13. It is an important function of rings 20 and 21 to retain oil in space 18 in a proscribed pressure range by minimizing oil leakage past the rings from space 18.

During operation of a squeeze film damper as described, particularly with respect to a hot gas turbine engine, shaft 15 will tend to develop some orbital motion in addition to its usual shaft rotation. This orbital motion alternately squeezes and releases the oil film in damper space 18 and develops a pumping action on the oil to move oil out of space 18 or redistribute the oil in space 18, for example, move the oil towards the seal rings 20 and 21. A common problem with dampers as described is difficulty in providing and maintaining a constant and sufficient quantity of oil in the damper for continuously effective long term operation.

The pumping action of a damper may be somewhat compared to a fluid pump where fluid is delivered to the pumping element in a lower pressure region and the pump delivers fluid at a higher pressure. Accordingly, in a fluid damper as described, it is most desirable to provide a ready supply of oil within the damper to compensate for the existing oil being redistributed by the pumping action, and oil leakage out of the damper which is necessary to prevent the damper oil from overheating. In the present invention a damper oil supply is incorporated adjacent the damper assembly and within the squeeze film space 18 as illustrated in FIG. 2.

Figure 2:
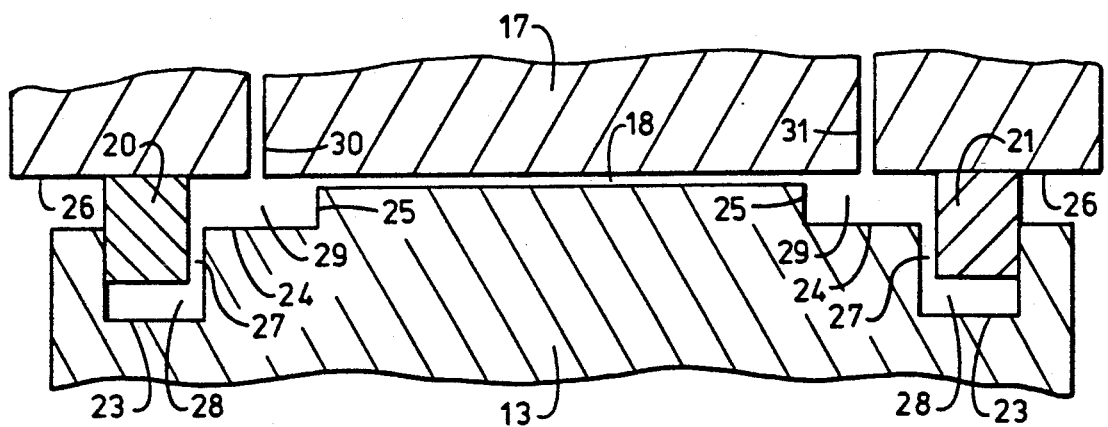
FIG. 2 is a partial and schematic illustration of the squeeze film section of a squeeze film damper incorporating a plenum of this invention.

FIG. 2 is an enlarged section of the components of FIG. 1 which incorporate the oil supply of this invention. In FIG. 2, outer annular race 13 includes a reduced diameter end section 24 at each end thereof with a defined shoulder part 25. Piston ring grooves 22 and 23 are formed radially in the reduced diameter sections 24 and adjacent a sidewall or end of race 13. A piston ring, ring 20 for example, resides in its groove 22 to sealingly engage opposite wall 26 of chamber 16 of housing 17. Ring 20 is illustrated as being closely adjacent one sidewall of its groove 22 to provide a sidewall for a vent space or oil dam 27 at its opposite side. Vent space or oil dam 27 is utilized to admit damper fluid under pressure from damper space 18 to the adjacent side of ring 20 to urge rings 20 and 21 into sealing engagement with their opposite groove wall. At the same time, damper fluid pressure is also admitted to the underside space 28 of rings and 21 to provide a radial force on the rings for in sealing of the rings against chamber wall 26.

As illustrated in FIG. 2, a circumferential oil plenum groove or reservoir 29 is conveniently provided in the damper assembly adjacent and inboard of each piston ring 20 and 21. Each piston ring is additionally utilized to serve as one sidewall of each groove 29 while the shoulder 25 serves as an opposite sidewall. Each plenum 29 is in unhindered fluid flow communication with fluid in damper space 18 so that, as pressure conditions in space 18 warrant, damper fluid is introduced into plenum 29 or automatically supplied from plenum 29 to space 18.

As further illustrated in FIG. 2, grooves 29 include some notable dimensions. For example, the depth dimension of plenum grooves 29 from the reduced diameter section 24 of race 13 to opposite wall 26 of chamber 16 is significantly greater than the depth or gap dimension of squeeze film space 18. Also, the radial or depth dimension of a plenum groove is less than the radial or depth dimension of piston ring groove 22. By this arrangement plenum grooves 29 contain a full supply of damper fluid for ready delivery to the pumping action occurring in the squeeze film space 18. At the same time, the position of plenum 29 at the outboard ends of damper 10, as lower pressure plenums, reduces oil leakage from the damper and therefore provides better fluid conservation for the damper assembly. As illustrated plenums 29 are adjacent grooves to the ring grooves 22 and 23, and each ring in its respective groove serves as a sidewall to its adjacent plenum groove 29 which also contributes to less oil leakage from the damper.

The invention provides an oil filled plenum supply within a squeeze film damper together with end sealing by means of piston ring seals operating adjacent the lower pressure plenum supply. The plenum supply is positioned in direct fluid flow relationship to the squeeze film region.

This invention also provides an improved squeeze film damper of the kind where a bearing circumferential support member such as the annular outer race of a rolling element bearing or an equivalent support member for other bearings, is caused to have radial or orbiting motion in an enclosed chamber in the bearing housing. The support member race acts on a fluid such as an oil in a defined squeeze film space between the race and an opposing wall of its enclosing chamber. The compressive force of the race on the oil to attempt to squeeze the oil out of the squeeze film space provides damping action. In the present invention, the bearing support, e.g. the annular outer race 13, may have an orbital motion in an annular chamber in the bearing housing. In operation the damper fluid may be squeezed axially to the sides of the race where piston ring type seals positioned coaxially in the grooves on the race engage the opposite chamber wall to seal oil in the damper space.

By means of this invention, lower pressure oil plenums are provided at each end of the damper and adjacent the piston seal rings to receive oil which is squeezed out of the squeeze film space due to pumping action generated by orbital motion of shaft 15, and to provide directly available oil to the squeeze space when the pumping action generates a lower pressure in the squeeze film space, i.e. on the suction side of the pumping cycle, which minimizes air entry into the damper.

Ordinarily, very high oil pressure is generated in squeeze film space 18 so that oil inlet 19 requires a flow control or check valve therein to prevent oil from squeeze film space 18 being pumped out of squeeze film space 18 through inlet conduit 19 and to permit oil entry into squeeze film space 18 when a lower pressure part of the damper cycle occurs.

Because plenums 29 represent regions of lower pressure and in direct and open fluid flow communication with squeeze film space 18, they advantageously serve as damper fluid inlet regions for damper 10. Accordingly, damper fluid inlet conduits 30 and 31 are located in housing 17 to supply damper fluid from an external source (not shown) directly into plenums 29 rather than into high pressure space 18 and minimizing or reducing check valve requirements.

While this invention has been disclosed and described with respect to a preferred embodiment thereof, it will be apparent to those skilled in the art that various changes and modifications may be made therein without departing from the spirit and scope of this invention as set forth in the following claims.

What is claimed is:

1. In a squeeze film damper assembly where a pair of spaced apart piston rings, in a circumferential surface of a bearing support member, seal a squeeze film damper space between said bearing support member, which is subject to radial motion, and a chamber wall confining said support member, the improvement comprising said support member having a pair of concentric fluid plenum grooves formed therein, one groove adjacent each of said rings and both grooves positioned between said rings, the radial dimension of said plenum groove being substantially greater than the radial dimension of said damper space, and said chamber wall including separate damper fluid supply conduit means for each of said plenum grooves, said conduit means being in direct fluid flow communication with said plenum grooves.

2. The invention as recited in claim 1 wherein each said fluid plenum groove is in open fluid flow communication with said damper space.

3. The invention as recited in claim 1 wherein each said ring constitutes a sidewall for its adjacent plenum groove.

4. A squeeze film damper particularly adapted for a hot gas turbine engine having a turbine rotor shaft mounted in a rolling element bearing, said squeeze film damper comprising in combination:
(a) a supporting housing surrounding said bearing and defining an annular chamber coaxial with said bearing,
(b) said bearing having an outer annular race positioned for radial motion in said chamber on occurrence of vibration or orbital motion of said turbine rotor shaft, (c) said annular race having an outer circumferential planar surface with a spaced apart pair of rectangular cross-section coaxial piston ring grooves in said surface, (d) a rectangular cross-section piston ring in each said groove and adapted to peripherally engage an opposite wall of said annular chamber to seal a damper fluid in the space between said rings, (e) said annular race having a pair of additional coaxial fluid plenum grooves formed therein between said rings, one groove adjacent to each of said piston ring grooves in the space between said ring grooves, and (f) a pair of damper fluid conduits formed in said supporting housing with one each in direct fluid flow communication with a respective one of said fluid plenum grooves to supply fluid to said plenum grooves.

5. A rolling element bearing component for a rolling element bearing squeeze film damper comprising in combination:

(a) an annular outer race for said bearing, (b) said race having an outer circumferential planar surface with a reduced diameter section at each side thereof, (c) a piston ring groove formed concentrically in said race in said reduced diameter section and adjacent each side edge of said surface, (d) a piston ring in each of said ring grooves, (e) said race having a spaced apart of plenum grooves concentrically formed therein so that each plenum groove adjoins a ring groove in fluid flow communication therewith, (f) each of said plenum grooves being between said ring grooves, and (g) conduit means connected to each of said plenum grooves for supplying fluid directly thereto.

6. The invention as recited in claim 5 wherein each said piston ring constitutes a sidewalll for its adjoining plenum grooves.

7. The invention as recited in claim 5 wherein said ring grooves and said plenum grooves have a rectangular cross-section.

8. The invention as recited in claim 5 wherein said plenum grooves have a radial dimension less than the radial dimension of said piston ring grooves.

9. The invention as recited in claim 5 wherein said piston ring grooves and said plenum grooves are located in said reduced diameter sections.

* * * * *